(12) United States Patent
Watanabe et al.

(10) Patent No.: US 7,794,643 B2
(45) Date of Patent: Sep. 14, 2010

(54) APPARATUS AND METHOD FOR MOLDING OBJECT WITH ENHANCED TRANSFERABILITY OF TRANSFER FACE AND OBJECT MADE BY THE SAME

(75) Inventors: Jun Watanabe, Atsugi (JP); Yasuo Yamanaka, Machida (JP); Kiyotaka Sawada, Atsugi (JP); Keiji Ueda, Kawasaki (JP); Yasunori Sugimoto, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 311 days.

(21) Appl. No.: 11/727,121

(22) Filed: Mar. 23, 2007

(65) Prior Publication Data
US 2007/0231575 A1  Oct. 4, 2007

(30) Foreign Application Priority Data
Mar. 24, 2006  (JP)  ............................ 2006-082392

(51) Int. Cl.
*B29C 45/00* (2006.01)
*B32B 9/04* (2006.01)

(52) U.S. Cl. ................. 264/328.1; 264/1.1; 264/40.6; 264/328.2; 264/237; 264/348; 425/542; 425/547; 425/143

(58) Field of Classification Search ............... 264/327, 264/328.7, 328.16, 1.1, 328.1, 328.2, 4.4, 264/237, 328.14, 348, 40.6, 1.32, 328.18; 425/552, 808, 143, 542, 547; 428/411.1
See application file for complete search history.

(56) References Cited

U.S. PATENT DOCUMENTS

| 4,385,089 A | * | 5/1983 | Bonnebat et al. | ......... 428/36.92 |
| 5,938,807 A | * | 8/1999 | Komiyama et al. | ......... 65/29.12 |
| 6,146,577 A | * | 11/2000 | Yamaki et al. | ............. 264/500 |
| 2004/0241383 A1 | | 12/2004 | Watanabe et al. | |

(Continued)

FOREIGN PATENT DOCUMENTS

JP  04-163119  6/1992

(Continued)

OTHER PUBLICATIONS

U.S. Appl. No. 10/800,647, filed Mar. 16, 2004.

*Primary Examiner*—Khanh Nguyen
*Assistant Examiner*—Keith T Aziz
(74) *Attorney, Agent, or Firm*—Dickstein Shapiro LLP

(57) ABSTRACT

A method of molding an object with a mold having a transfer face includes the steps of filling, separating, re-melting, re-contacting, cooling, and removing. The filling step fills a thermoplastic material, having a temperature greater than a softening temperature of the thermoplastic material, into a cavity space in the mold having a temperature smaller than the softening temperature of the thermoplastic material. The thermoplastic material comes in contact with the transfer face and is cooled. The separating step separates the transfer face from the thermoplastic material to form a heat-insulating layer between the thermoplastic material and transfer face. The re-melting step re-melts the thermoplastic material with heat energy retained inside the thermoplastic material. The re-contacting step re-contacts the re-melted thermoplastic material to the transfer face. The cooling step cools the thermoplastic material to a temperature smaller than the softening temperature of the thermoplastic material. The removing step removes the cooled thermoplastic material from the mold.

12 Claims, 10 Drawing Sheets

U.S. PATENT DOCUMENTS

| | | | |
|---|---|---|---|
| 2006/0073294 A1* | 4/2006 | Hutchinson et al. | 428/35.7 |
| 2007/0013097 A1* | 1/2007 | Ohba et al. | 264/85 |
| 2007/0034321 A1* | 2/2007 | Glacet et al. | 156/230 |
| 2008/0038395 A1* | 2/2008 | Nicol | 425/170 |

FOREIGN PATENT DOCUMENTS

| | | |
|---|---|---|
| JP | 08-244085 | 9/1996 |
| JP | 11-028745 | 2/1999 |
| JP | 2000-025120 | 1/2000 |
| JP | 2003-211475 | 7/2003 |
| JP | 2004-284110 | 10/2004 |
| JP | 2005-049829 | 2/2005 |
| JP | 2005-205860 | 8/2005 |

* cited by examiner

APPARATUS AND METHOD FOR MOLDING OBJECT WITH ENHANCED TRANSFERABILITY OF TRANSFER FACE AND OBJECT MADE BY THE SAME

FIELD OF THE INVENTION

The present disclosure relates to a method and an apparatus for manufacturing a molded object having a higher precision surface, and to an optical element having a fine-finished optical plane and micro-pattern molded with higher precision.

BACKGROUND OF THE INVENTION

An image forming apparatus (e.g., copier, laser beam printer) may employ an optical scanning system having an optical element such as a f-theta lens, and a projection lens.

With an increased demand on cost reduction on a finished product, materials used for such optical element have been shifted from glass material to resinous material.

For a long period of time, such optical element has been made as an optical element having a spherical surface shape such as a convex-shaped lens and a concave-shaped lens.

However, such optical element having a spherical surface shape may need a plurality of optical elements (e.g., two to three elements) to correct an optical error (e.g., picture out of focus) because such optical error may not be corrected by one optical element.

If the number of optical elements used in an optical scanning system increases, it may unfavorably increase the manufacturing cost, and may unfavorably restrict the freedom of structural layout of the optical scanning system.

Accordingly, it is preferable to use a smaller number of optical elements in an optical scanning system to reduce the manufacturing cost and to increase the freedom of structural layout while maintaining or improving an optical function of the optical scanning system.

Such optical scanning system having a smaller number of optical elements may be realized by using an optical element having a non-spherical surface shape, which may have a complex pattern.

With such optical element having a non-spherical surface shape, an optical scanning system may conduct multiple functions with a smaller number of optical elements, which may be preferable from a viewpoint of reducing the manufacturing cost and increasing the freedom of structural layout.

For example, such optical element having a non-spherical surface shape may include a lens having an uneven thickness.

Such lens having an uneven thickness may be made by an injection molding method, which is commonly used for mass producing at a lower manufacturing cost.

However, such lens (e.g., having an uneven thickness) manufactured by an injection molding method may have drawbacks as set forth below.

A lens having an uneven thickness may inevitably have deviation (or unevenness) of lens thickness in different portions of the lens. When manufacturing such lens by an injection molding method, a resin material filling the mold of an injection molding machine can have different shrinking rates at different portions of the filled resin material, such that a lens having an uneven thickness is not formed with high precision.

For example, such filled resin material can have thermal stress at its thin-walled portion or at a portion near a gate of the injection molding machine. Accordingly, a lens having unfavorable quality such as double refraction (or birefringence), for example, may be manufactured.

Several methods have been devised in the past for reducing such drawbacks of injection molding method. For example, one such method is conducted as below.

A resin material is heated in a metal mold to its glass transition temperature or higher, and the resin material is then slowly cooled. After such cooling, the molded object made of resin material may be removed from the metal mold. Such method suppresses the occurrence of internal strain in a molded object to obtain a molded object having a higher shape precision.

In another method, a resin material prepared in advance is set in a metal mold, and then such metal mold is heated to the glass transition temperature of the resin material or higher to melt the resin material. The resin material is slowly cooled thereafter. In such a process, an internal pressure can build up in the resin material.

In yet another method, the metal mold may be heated to a glass transition temperature of a resin material or higher, and then the resin is injected and fills the heated metal mold for a given period of time. Thereafter, the metal mold is cooled to a temperature lower than the glass transition temperature of the resin material, and then the molded object made of resin material may be removed from the metal mold.

In yet another method, a resin material fills the cavity of the metal mold and is heated to its glass transition temperature or higher. The resin material is then cooled to a temperature near the glass transition temperature while maintaining the pressure applied to the resin material at substantially the same level during the cooling process by adjusting the pressure applied from an external side of the metal mold.

The above-mentioned methods require heating a metal mold to a temperature greater than the glass transition temperature of the resin material, and then cooling the metal mold.

Accordingly, the molding cycle is significantly longer. Furthermore, because the metal mold must to be heated to a glass transition temperature of the resin material or higher for each molding cycle, such methods require greater power consumption.

In another related method, an injection molding method is conducted as described below, which is explained with reference to FIGS. 1A and 1B.

As shown in FIG. 1A, injection molding may be conducted, for example, with metal molds 101 and 102 having a transfer face portion 103 and a non-transfer face portion 104, and a movable mold 105.

As shown in FIG. 1A, the mold unit 101 and 102 may be configured to set the non-transfer face portion 104 in a given position with respect to the transfer face portion 103. The non-transfer face portion 104 may not be used for transferring a shape or pattern to a resin, which may become an molded object.

The movable mold 105 is slidable within the mold unit 101 and 102 as shown in FIG. 1B.

A melted resin 106 is injected and fills the cavity formed by the metal molds 101 and 102 and the movable mold 105.

Then, a pressure is applied to the transfer face portion 103 to closely contact the resin 106 to the transfer face portion 103.

Then, the melted resin 106 is cooled to a temperature lower than the softening temperature of resin 106, and a molded object made of resin 106 may be removed from the metal molds 101 and 102.

As shown in FIG. 1B, during a time period for cooling the melted resin 106 to a temperature lower than the softening temperature of the resin 106, the movable mold 105 slides in a direction away from the resin 106 to form a void 107 between the resin 106 and the movable mold 105.

In such molding method, the non-transfer face portion 104 facing the void 107 may not contact a wall face of the metal molds 101 and 102, wherein the resin 106 is more fluid on such a portion.

Accordingly, as shown in FIG. 1B, a surface sink may preferentially occur in the non-transfer face portion 104, wherein the surface sink may have a concave shape, a convex shape, or both concave and convex shape, for example.

With such method, an occurrence of surface sink in the transfer face portion 103 may be prevented or suppressed, such that a molded object having a higher precision shape is produced.

Furthermore, the metal molds 101 and 102 is not heated to a temperature greater than the glass transition temperature of the resin 106, such that the molding cycle is set to a shorter period of time, and thereby the electric power consumption required for injection molding may be set to a smaller level.

However, the above-explained injection molding method shown in FIG. 1 may not effectively induce a surface sink to a face portion of a given type of lens such as a projection lens 110 shown in FIG. 2.

As shown in FIG. 2, the projection lens 110 may have a transfer face portion 111 and a non-transfer face portion 112, wherein the non-transfer face portion 112 may not be used for transferring a shape or a pattern.

As shown in FIG. 2, the transfer face portion 111 of the projection lens 110 may have a relatively greater area, and the non-transfer face portion 112 may have a relatively smaller area for making a void.

Such non-transfer face portion 112 may be too small to effectively induce a surface sink to the non-transfer face portion 112, such that a surface sink may unfavorably occur in the transfer face portion 111.

In recent years, an optical element may have an optical surface formed with a micro-pattern so that a new optical function can be added to the optical element.

For example, an optical element having a new optical function may be a diffraction lens having diffraction effect, manufactured by forming a diffraction pattern on an optical surface of the lens. The pitch of diffraction pattern may be several times the wavelength of light, for example.

When such diffraction pattern is formed on a fine-finished optical plane of the diffraction lens, an aberration property of an optical system may be improved or wavelength selectivity can be provided to an optical system.

If a microstructure having a pitch (e.g., lattice, pillars, or pit) smaller than the wavelength of light is provided on an optical surface of an optical element, such optical element may have a function that is equivalent to an optical element having a thin film with a given refraction index thereon.

Accordingly, by modifying the arrangement or structure of the microstructure, an optical element may be given a function such as an antireflection function.

In general, a reflected light coming from a fine-finished optical plane may cause a ghost or a flare phenomenon, which may result into a degradation of an image quality.

Such drawback may be suppressed by coating an antireflective layer on an optical element with a vacuum deposition method.

However, a molding method that can form the above-mentioned microstructure directly on an optical surface of an optical element may be favorable than a vacuum deposition method for coating a given layer on an optical element after the molding process from a viewpoint of total manufacturing cost.

In general, in an injection molding method for manufacturing a molded object, a molding cycle may be shortened as below.

For example, a metal mold may be heated and maintained at a temperature lower than a softening temperature of resin material. Then a melted resin material may be injected to fill the metal mold, and then the resin material may be quenched and solidified to manufacture a molded object.

However, such injection molding method may not produce a molded object having a higher precision in some cases.

For example, when an optical element having a diffraction pattern or micro-pattern is manufactured by such injection molding method, a melted resin material, filling the metal mold, may contact a surface of the metal mold.

The surface portion of the melted resin may be instantaneously quenched by such contact condition because the metal mold may be maintained at a temperature lower than a softening temperature of resin material. Because of such quenching, a resin material may not be effectively filled in the micro-pattern.

Accordingly, a resultant molded object may have lower optical quality.

In view of such drawback of injection molding method for transferring a micro-pattern to an optical element, the following related arts may be used.

In one related art, the temperature of a resin material may be set in a temperature range greater than the glass transition temperature of the resin material (e.g., plus 10° C. to 150° C. from the glass transition temperature), and a micro-pattern may be transferred to the resin material to manufacture an optical element.

In another related art, a metal mold may be made of a material having a lower heat conductivity (e.g., 20 W/m·K) so that the resin material may be cooled at a relatively slower rate. By using a metal mold having lower heat conductivity, rapid quenching of resin material may be suppressed.

In another related art, after filling a metal mold with a resin material, such metal mold may be heated to a temperature greater than the glass transition temperature of the resin material, and then pressure may be applied to a transfer face portion to form an optical pattern on the resin material.

In another related art, a mold frame may be made of translucent material, in which a given energy (e.g., light beam) may be irradiated to a resin material to heat the resin material to a glass transition temperature or more, and then pressure may be applied to a transfer face portion to form an optical pattern on the resin material.

However, such related arts may also need a relatively longer molding cycle or time because a relatively longer thermal cycle may be required, wherein the thermal cycle may include a heating process of a metal mold to a glass transition temperature and a subsequent cooling process, for example.

Furthermore, such related arts may not have stable transferability because of temperature instability during the molding process.

Even if a metal mold may be made of a material having a lower heat conductivity as above mentioned, a resin material may be cooled when the resin material flows in the metal mold because the temperature of the metal mold may be maintained at a temperature lower than a softening temperature of the resin material.

Accordingly, such resin material may be further cooled to a lower temperature as the resin material further goes into a portion of a cavity, which is far from the gate of the metal mold. Under such condition, the resin material may not be effectively filled in the metal mold.

Therefore, the resultant molded object may not have a higher quality pattern shape (e.g., micron order shape) thereon.

Furthermore, if a metal mold is made of a material having a lower heat conductivity, the molding time may become longer because the cooling rate of the resin material may become slower. Such molding time may become longer as the thickness of the molded object becomes greater.

Although, a translucent material (e.g., sapphire, silicon) may be used for the mold frame as above-mentioned, such translucent material may be significantly expensive compared to a metal, and may have a lower strength compared to a metal.

Accordingly, the pressure that can be applied to the translucent material may become a smaller value, and thereby a transfer pattern may not be effectively transferred to the resin material.

Furthermore, such translucent material may not be preferable for uniform heating of a molded object having a greater area or curved portion. Accordingly, the resultant molded object may be produced with a lower quality or precision.

BRIEF SUMMARY OF THE INVENTION

The present disclosure relates to a method of molding an object with a mold having at least one transfer face which includes the steps of filling, separating, re-melting, re-contacting, cooling, and removing. The filling step fills a melted thermoplastic material into a cavity space, defined by the mold. The melted thermoplastic material has a temperature greater than a softening temperature of the thermoplastic material, and the mold has a temperature smaller than the softening temperature of the thermoplastic material. The melted thermoplastic material contacts at least one transfer face of the mold and is cooled by contacting the mold. The separating step separates the transfer face from a surface portion of the melted thermoplastic material to form a heat-insulating layer between the melted thermoplastic material and the transfer face. The re-melting step re-melts the surface portion of the thermoplastic material with heat energy retained inside the thermoplastic material having a temperature still greater than the softening temperature of the thermoplastic material under a condition that the melted thermoplastic material is separated from the transfer face of the mold. The re-contacting step re-contacts the surface portion of the re-melted thermoplastic material closely to the transfer face of the mold. The cooling step cools the melted thermoplastic material to a temperature smaller than the softening temperature of the thermoplastic material. The removing step removes the cooled thermoplastic material from the mold.

The present disclosure also relates to a molding apparatus for manufacturing a molded object, which includes a mold and a mold driving unit. The mold has at least one transfer face and defines a cavity space filled with a melted thermoplastic material having a temperature greater than the softening temperature of the thermoplastic material. The mold has a temperature smaller than the softening temperature of the thermoplastic material. The mold driving unit moves the mold in a given direction. The mold driving unit moves the mold in a first direction to separate the transfer face from a surface portion of the melted thermoplastic material to form a heat-insulating layer between the transfer face and the surface portion of the melted thermoplastic material so that the surface portion of the thermoplastic material is re-melted with heat energy retained inside the thermoplastic material having a temperature still greater than the softening temperature of the thermoplastic material under a condition that the melted thermoplastic material is separated from the transfer face of the mold. The mold driving unit moves the mold in a second direction to re-contact the transfer face of the mold closely to the surface portion of the re-melted thermoplastic material, and maintains a contact condition of the transfer face and the melted thermoplastic material until the melted thermoplastic material is cooled to a temperature smaller than the softening temperature of the thermoplastic material.

The present disclosure also relates to a molded object manufactured by the above-mentioned method, which includes an optical element having any one of a fine-finished optical plane, a micro-pattern having concave/convex pattern thereon, and a micro-pattern having concave/convex pattern and a fine-finished optical plane thereon, transferred from the transfer face of the mold.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1A:
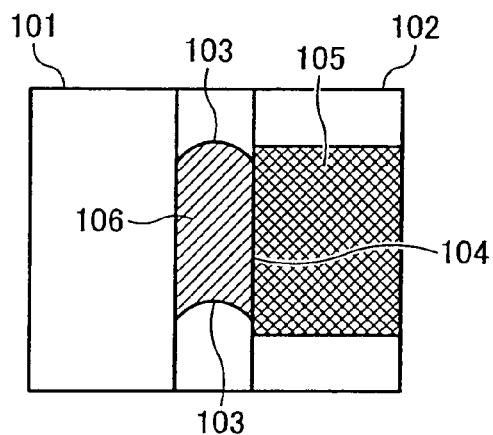
FIGS. 1A and 1B are schematic cross-sectional views for explaining a conventional molding method for producing a molded object.
Figure 1B:
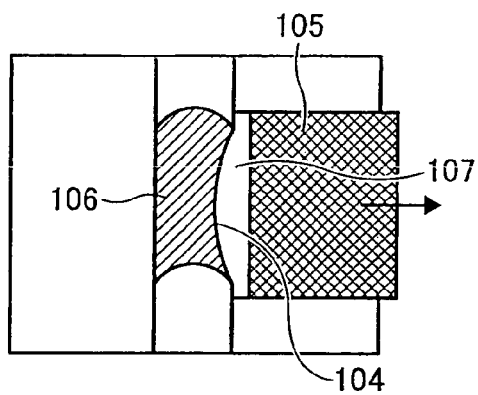
Figure 2:
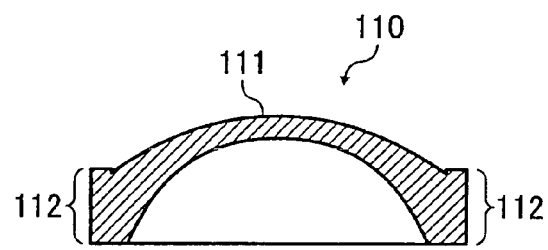
FIG. 2 is a schematic cross-sectional view of a projection lens used for explaining a drawback of the conventional molding method.

The accompanying drawings are intended to depict example embodiments and should not be interpreted to limit the scope thereof. The accompanying drawings are not to be considered as drawn to scale unless explicitly noted.

DETAILED DESCRIPTION OF THE INVENTION

It will be understood that if an element or layer is referred to as being "on," "against," "connected to" or "coupled to" another element or layer, then it can be directly on, against connected or coupled to the other element or layer, or intervening elements or layers may be present. In contrast, if an element is referred to as being "directly on", "directly connected to" or "directly coupled to" another element or layer, then there are no intervening elements or layers present.

Like numbers refer to like elements throughout. As used herein, the term "and/or" includes any and all combinations of one or more of the associated listed items.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein should be interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to the drawings, wherein like reference numerals designate identical or corresponding parts throughout the several views, a molding apparatus according to an example embodiment is described with particular reference to FIGS. 3A to 3D.

FIGS. 3A to 3D schematically show a configuration of a molding apparatus 100 according to an example embodiment.

Figure 3A:
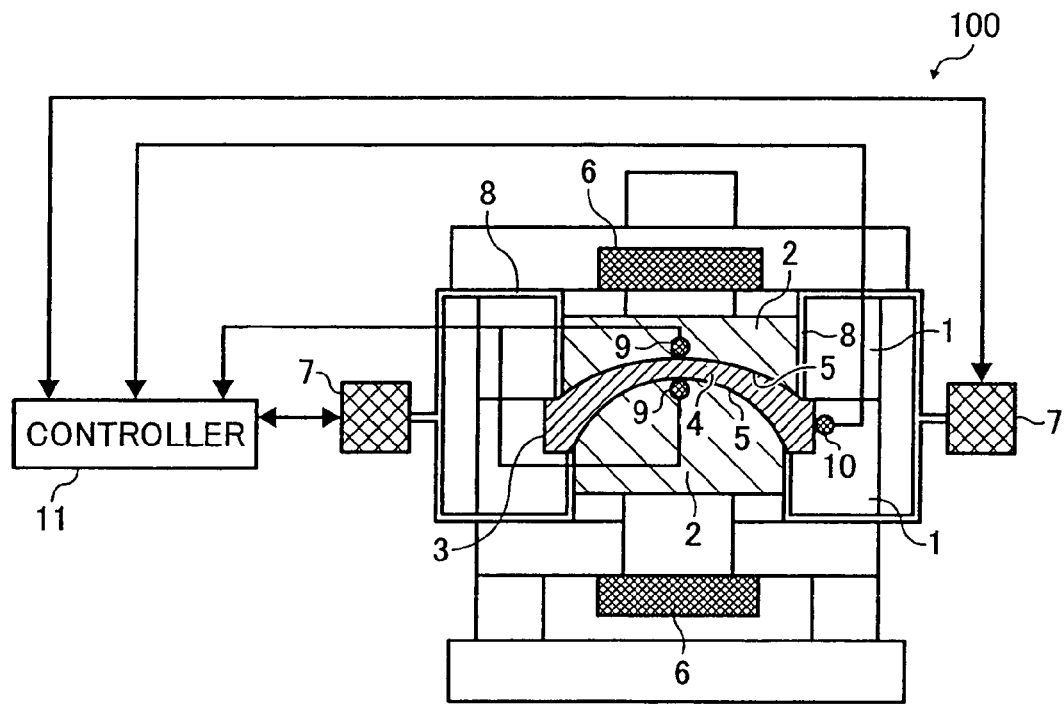
FIGS. 3A to 3D show a schematic configuration of a molding apparatus according to an example embodiment.

As shown in FIG. 3A, the molding apparatus 100 may include a mold unit 1, a movable mold 2, a resin 4, a mold driving unit 6, a compressed gas injector 7, a communicating hole 8, a pressure sensor 10, and a controller 11, for example.

The mold unit 1 may include a pair of mold units, which may be an upper mold unit and a lower mold unit, for example. The mold unit 1 may be made of a given metal material, which may be selected under a design concept of the molding apparatus 100.

The movable mold 2 may include a pair of molds, which may be an upper movable mold and a lower movable mold, for example. The number of movable mold 2 may be set to a given number by considering the design concept of the molding apparatus 100.

The movable mold 2 may be slidable in the mold unit 1, and may have a transfer face 5 as shown in FIGS. 3A to 3D.

A cavity 3 may be formed between the mold unit 1 and the movable mold 2, and the resin 4 may fill the cavity 3. As shown in FIG. 3A, the cavity 3 may not be explicitly shown in the drawing when the resin 4 fills the cavity 3.

The mold driving unit 6 may move the movable mold 2 in a given direction such as up/down direction so that the movable mold 2 may selectively apply pressure to the resin 4 in the cavity 3.

The compressed gas injector 7 may inject compressed gas to the cavity 3 through the communicating hole 8.

The temperature sensor 9 may detect temperature of the resin 4 in the cavity 3.

The pressure sensor 10 may detect a pressure in the mold unit 1 such as resin pressure in the cavity 3.

The controller 11 may receive data from the temperature sensor 9 and pressure sensor 10 (e.g., detected temperature and pressure) or operation information from a device (not shown), and may control the mold driving unit 6 and compressed gas injector 7 with such data or information, for example. The controller 11 may include a computer including a CPU (central processing unit), for example.

As shown in FIG. 3A, the movable mold 2 may define the cavity 3 having a given volume.

Such movable mold 2 may have the transfer face 5 having a given shape or pattern to be transferred to the resin 4 to be filled in the cavity 3.

The transfer face 5 may have a mirror-finished surface, for example. In case of producing a lens by the molding method, the transfer face 5 may have a pattern for an incidence plane and an exit plane of a lens, for example.

Such transfer face 5 may have a given pattern depending on the types of objects to be manufactured with the molding apparatus 100.

The movable mold 2 may be movable in the mold unit 1, and coupled to the mold driving unit 6, which may control the movement of the movable mold 2.

The movable mold 2 may have a sliding surface, which may be coupled to the compressed gas injector 7 through the communicating hole 8. The compressed gas injector 7 may inject a compressed gas to the cavity 3 through the communicating hole 8.

The mold unit 1 may be maintained at a temperature, which may be lower than a softening temperature of the resin 4, by a heater or a temperature controller (not shown) or the like.

The resin 4 may be formed into a molded object by the molding apparatus 100.

Figure 4A:
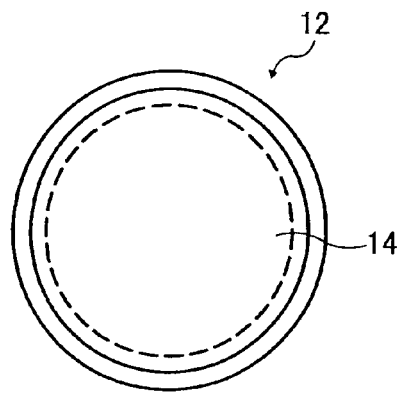
FIGS. 4A and 4B are schematic front and cross-sectional views of an example optical element manufactured by a molding apparatus according to an example embodiment.
Figure 4B:
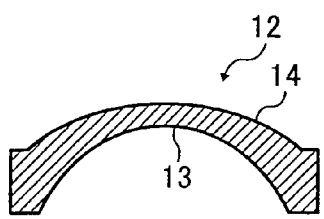

With such molding apparatus 100, a projection lens 12 shown in FIGS. 4A and 4B may be manufactured.

FIG. 4A is a front view of the projection lens 12, and FIG. 4B is a schematic cross-sectional view of the projection lens 12.

The projection lens 12 may have an incidence plane 13 and an exit plane 14, which may respectively correspond to a fine-finished optical plane having a concave face and a convex face, wherein the fine-finished optical plane may need to be manufactured with a higher precision.

The projection lens 12 may be a substantially circle lens having an uneven thickness shape. For example, the projection lens 12 may have a diameter of 70 mm, a center portion thickness of 3 mm, and a peripheral portion thickness of 8 mm.

The projection lens 12 may be made of a resin material such as PMMA (polymethyl methacrylate) resin having a softening temperature of 110° C., for example.

Hereinafter, a molding method conducted by the molding apparatus 100 according to an example embodiment is explained.

At first, the melted resin 4 (e.g., PMMA resin) may be injected and fill the cavity 3 through a gate (not shown) of the molding apparatus 100.

During the time period of filling of the melted resin 4 into the cavity 3, the mold driving unit 6 may maintain the movable mold 2 at a giver position to prevent a movement of the movable mold 2 caused by the pressure of the melted resin 4.

During the time period that the resin 4 is cooled to a temperature of the cavity 3 (or mold unit 1), which may be lower than a softening temperature of the resin 4, the compressed gas injector 7 may inject a compressed gas to a boundary area between the resin 4 and the transfer face 5 through the communicating hole 8.

Figure 3B:
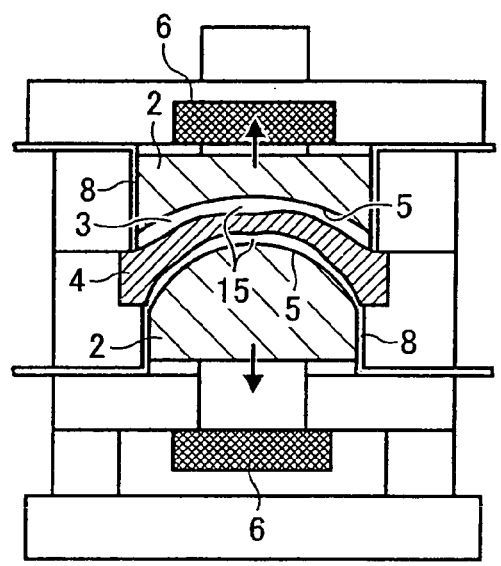

When the temperature sensor 9 detects one of the following transfer face separation conditions in the resin 4 filling the cavity 3, the mold driving unit 6 may move the movable mold 2 in a given direction so that the movable mold 2 may be separated from the resin 4 to form a void 15 (e.g., air space) between the transfer face 5 and resin 4 (refer to FIG. 3B). The void 15 may function as a heat-insulating layer for the resin 4.

Such transfer face separation condition may include: 1) when an internal temperature of the center portion of the resin 4 becomes greater than a softening temperature of resin 4; and 2) when the temperature sensor 9 detects that a surface portion temperature of the resin 4 becomes smaller than a softening temperature of the resin 4 and an average temperature of the resin 4 is greater than a softening temperature of the resin 4.

After separating the movable mold 2 from the resin 4, the resin 4 may have an internal heat distribution therein, in which the center portion of the resin 4 may have a relatively larger heat energy and the surface portion of the resin 4 may have a relatively smaller heat energy.

Accordingly, heat energy may be transferred from the center to the surface portion of the resin 4, by which the surface portion of the resin 4 may be heated again and re-melted.

When the temperature sensor 9 detects that the surface portion temperature of the resin 4 facing the void 15 becomes greater than a softening temperature of the resin 4, the mold driving unit 6 may move the movable mold 2 in a given direction so that the movable mold 2 may closely re-contact the resin 4, such that the resin 4 and the transfer face 5 closely re-contact each other.

Figure 3C:
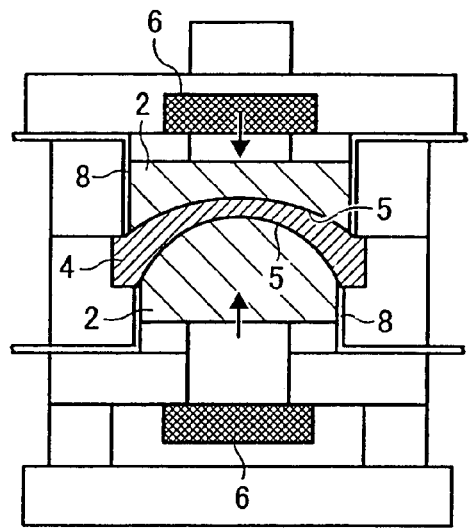

With such re-contacting process, a shape or pattern formed on the transfer face 5 may be transferred on a surface of the resin 4 as shown in FIG. 3C.

After such re-contacting process, the resin 4 may be cooled to a temperature of a wall of the mold unit 1, which may contact with the resin 4.

Figure 3D:
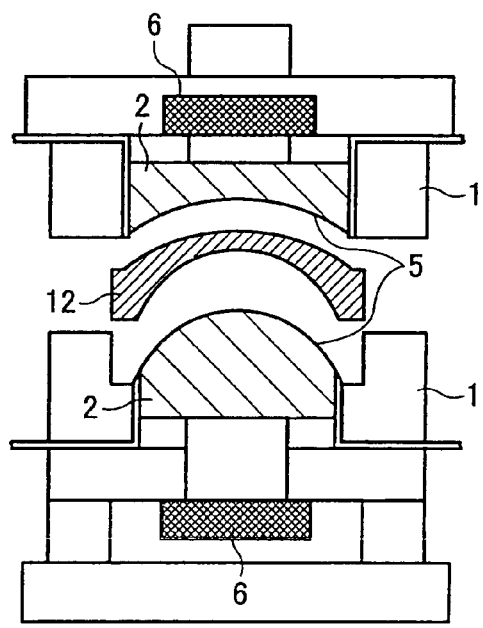

After such cooling process, the projection lens 12 may be removed from the mold unit 1 as shown in FIG. 3D, by which the projection lens 12 may be produced as a molded object.

In the above explained molding process, the resin 4 may be filled in the cavity 3, and then the transfer face 5 may be temporarily separated from the resin 4 to form the void 15 between the resin 4 and the transfer face 5.

Under such separation condition, the resin 4 has a portion facing the void 15, which may be termed as "free face portion" because such portion may not contact a wall face defining the cavity 3, and thereby such wall face may not restrict such free face portion of the resin 4.

Such free face portion of the resin 4 may have a relatively greater fluidity than other portion of the resin 4. Such fluidity at the free face portion of the resin 4 may preferably reduce an occurrence of unevenly distributed pressure in the resin 4, such that the projection lens 12 (as molded object) produced by cooling the resin 4 has a lesser internal strain.

Figure 5:
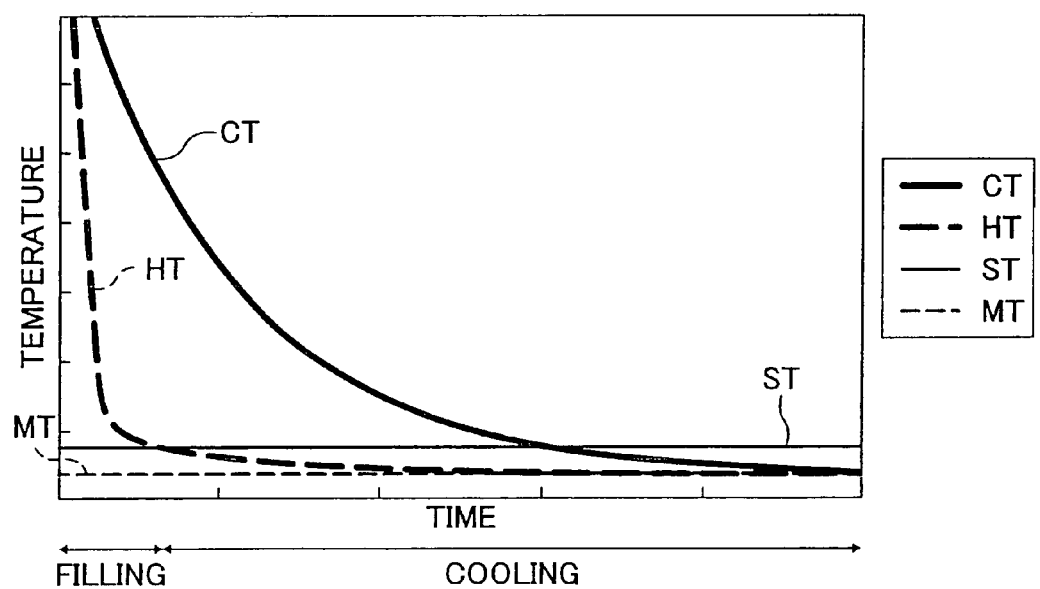
FIG. 5 is a graph for showing the temperature change of resin in a cavity of a molding apparatus when conducting a conventional injection molding.

FIG. 5 shows an example chart explaining the temperature change of resin in a cavity when conducting a molding process by a conventional injection molding method.

Figure 6A:
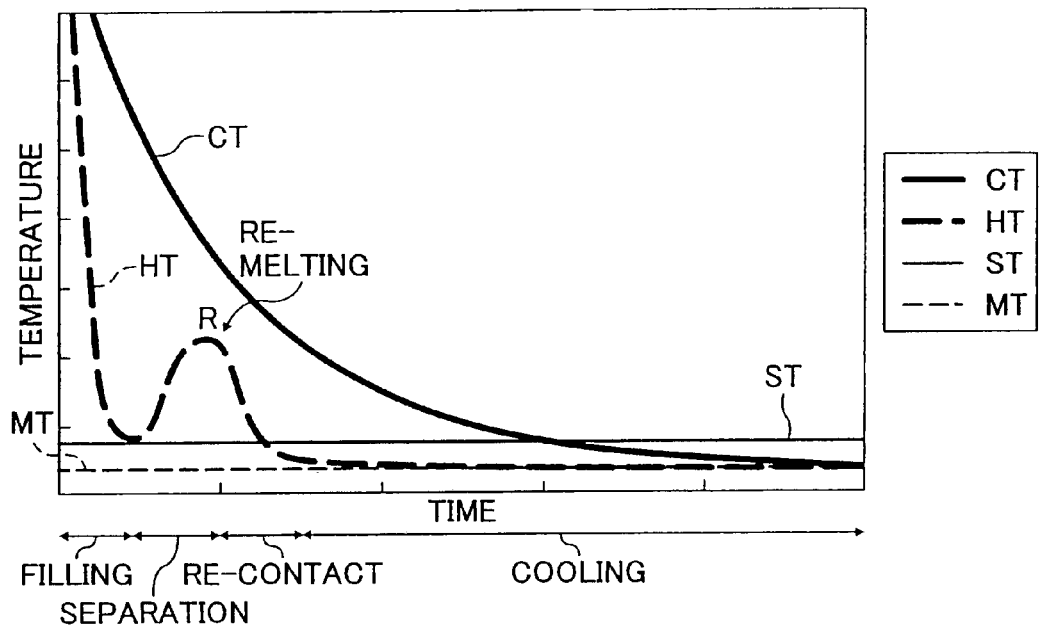
FIG. 6A is a graph for showing the temperature change of resin in a cavity of a molding apparatus according to an example embodiment.

FIG. 6A shows an example chart explaining the temperature change of resin in a cavity when conducting a molding process by an injection molding method according to an example embodiment.

Figure 6B:
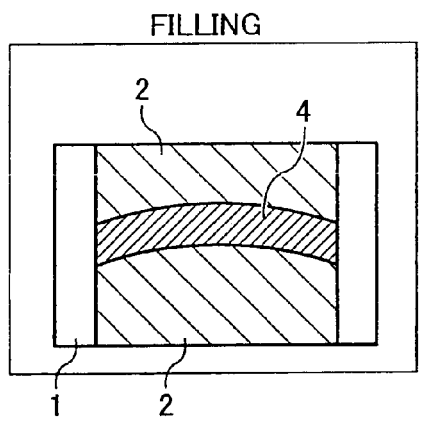
FIGS. 6B to 6D are schematic views of relationships of resin and mold when conducting an injection molding with a molding apparatus according to an example embodiment.
Figure 6C:
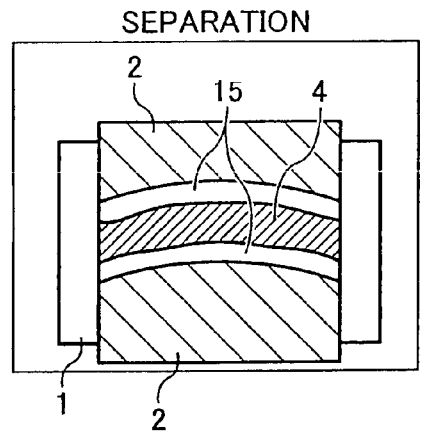
Figure 6D:
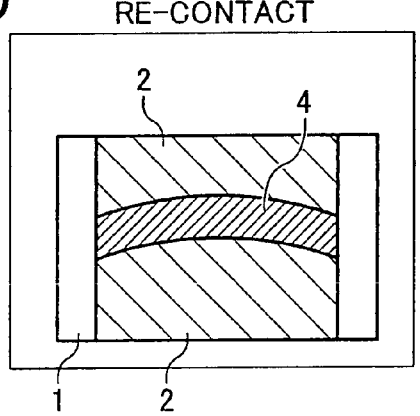

FIGS. 6B to 6D are schematic views of relationships of the resin 4 and the mold unit 1 when conducting an injection molding with the molding apparatus 100 according to an example embodiment.

In FIGS. 5 and 6A, the line "CT" shows the temperature change of the internal center portion of the resin 4, the line "HT" shows the temperature change of the surface portion of the resin 4, the line "ST" shows a softening temperature of the resin 4, and the line "MT" shows a temperature of the mold unit 1.

The temperature change of resin in a cavity when conducting a conventional injection molding method may be explained as below with reference to FIG. 5.

After filling the resin in the cavity, a surface portion of the resin may contact a surface of a mold (e.g., metal mold) having a temperature lower than a softening temperature of the resin.

Accordingly, the surface portion of the resin may be quenched by such contact with the mold, by which a surface portion temperature HT of the resin may decrease rapidly as shown in FIG. 5.

Because the resin may have a smaller heat-transfer coefficient, an internal center-portion temperature CT of the resin may not decrease so rapidly, and the temperature CT may be maintained above a softening temperature of the resin for a relatively longer period of time.

Such heat energy at the center portion of the resin may be transferred to the surface portion of the resin and further transferred to the wall face around the cavity, which may have a temperature lower less than a softening temperature of the resin.

With such heat transfer phenomenon, the center portion of the resin may be gradually cooled to a temperature of the mold having a temperature lower than a softening temperature of the resin, by which the resin may be solidified.

Hereinafter, the temperature change of a resin in a cavity when conducting an injection molding method according to an example embodiment is explained as below with reference to FIGS. 6B to 6D.

As shown in FIG. 6B, after filling the resin 4 in the cavity 3, a surface portion of the resin 4 may contact a surface of the mold unit 1 having a temperature lower than a softening temperature of the resin 4.

Accordingly, the surface portion of the resin 4 may be quenched by such contact with the mold unit 1, by which a surface portion temperature HT of the resin 4 may decrease rapidly as shown in FIG. 6A as similar to a conventional injection molding method shown in FIG. 5.

Because the resin 4 may have a smaller heat-transfer coefficient, an internal center-portion temperature CT of the resin 4 may not decrease so rapidly, and the temperature CT may be maintained above a softening temperature of the resin 4 for a longer period of time as shown in FIG. 6A.

As shown in FIG. 6C, the transfer face 5 may be separated from the resin 4 to form the void 15, wherein the void 15 may become a heat-insulating layer.

In a configuration shown in FIG. 6C, heat energy at the internal center portion of the resin 4 may be transferred to the surface portion of the resin 4, but may not be further transferred to the wall face around the cavity 3 because the void 15 having a heat-insulating function is formed around the surface portion of the resin 4.

Accordingly, the surface portion of the resin 4, which may be cooled by contacting the wall face around the cavity 3 when the resin 4 is filled into the cavity 3, may be re-melted by a heat energy of the resin 4 at a re-melting condition R shown in FIG. 6A.

Such re-melted surface portion of the resin 4 may be re-contacted closely to the transfer face 5 as shown in FIG. 6D.

Similar to a conventional injection molding method, heat energy at the internal center portion of the resin 4 may be transferred to the surface portion of the resin 4 and further transferred to the wall face around the cavity 3 (or mold unit 1) having a temperature lower than a softening temperature of the resin 4.

With such heat transfer phenomenon, the center portion of the resin 4 may be gradually cooled to a temperature of the mold unit 1 having a temperature lower than a softening temperature of the resin 4, such that a molded object (e.g., projection lens 12) is solidified and produced.

In an example embodiment, the surface portion of the resin 4 may be re-contacted closely to the transfer face 5 at a given timing when the surface portion of the resin 4 is in a re-melted condition.

Accordingly, a shape or pattern formed on the transfer face 5 may be transferred onto the surface portion (i.e., free face) of the resin 4 as fine-finished optical plane with a higher precision.

Furthermore, in the above-described injection molding method according to an example embodiment, the mold unit 1 may have a temperature, which may be lower than a softening temperature the resin 4.

Accordingly, a molding cycle may be set to a shorter period of time, and the consumption of electric power when conducting an injection molding method may be effectively reduced.

In an example embodiment, the compressed gas injector 7 may inject a compressed gas to a boundary area between the transfer face 5 and resin 4 through the communicating hole 8 before separating the transfer face 5 from the resin 4.

With such injection of compressed gas, a contact force between the transfer face 5 and resin 4 may be reduced effectively, and the transfer face 5 may be separated from the resin 4 easily, by which the void 15 may be formed smoothly between the transfer face 5 and the resin 4.

In an example embodiment, the communicating hole 8 can be formed at any portion of the molding apparatus 100 such as the sliding surfaces of the movable mold 2.

However, because an impression shape of the communicating hole 8 may remain on a finished molded object (e.g., projection lens 12), the communicating hole 8 may be preferably formed on a portion that may not affect the transfer face 5, used for transferring a pattern or a shape. Such portion may be termed an ineffective portion for the transfer face 5.

If the communicating hole 8 becomes too large, the resin 4 may intrude in the communicating hole 8, and a burr may be formed on a finished molded object (e.g., projection lens 12). In an example embodiment, the communicating hole 8 may preferably have a diameter of 100 µm or less, and more preferably a diameter of 20 µm or less, for example.

In an example embodiment, the compressed gas injector 7 may inject a compressed gas, which is controlled to a given temperature, to the void 15 through the communicating hole 8 after forming the void 15, by which a temperature in the void 15 may be controlled to a given temperature level.

Accordingly, a shape or pattern formed on the transfer face 5 may be transferred to a surface of the resin 4 with higher precision and stability.

A communicating hole used for injecting a compressed gas to a boundary area between the resin 4 and the transfer face 5 before forming the void 15, and a communicating hole for injecting a temperature-controlled compressed gas to the void 15 may be set as a common hole or different holes, as required.

Figure 7A:
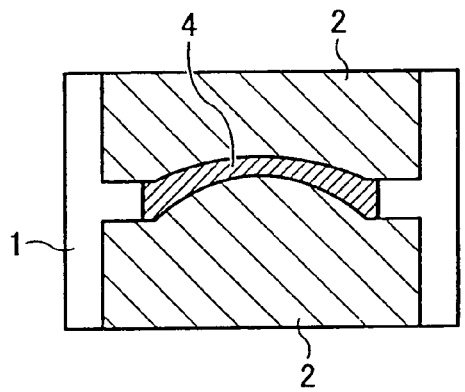
FIGS. 7A and 7B are schematic views of relationships of resin and metal mold, in which a resin is not be supported by a metal mold.
Figure 7B:
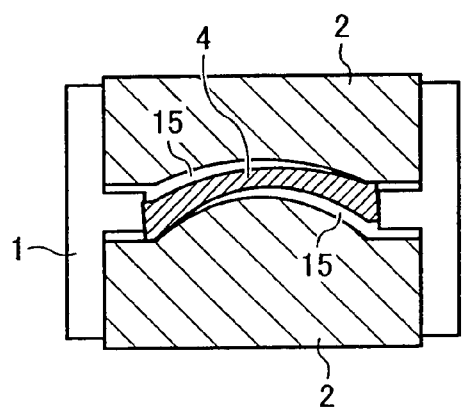

In an example embodiment, the transfer face 5 may be moved as shown in FIGS. 7A and 7B, for example.

In FIG. 7A and FIG. 7B, a pair of molds for the movable mold 2 may be moved in different directions as shown in FIG. 7B. If a moving timing of both molds deviate from each other, the resin 4 may be pulled to one of the molds, such that the void 15 is not effectively formed as shown in FIG. 7B.

Figure 7C:
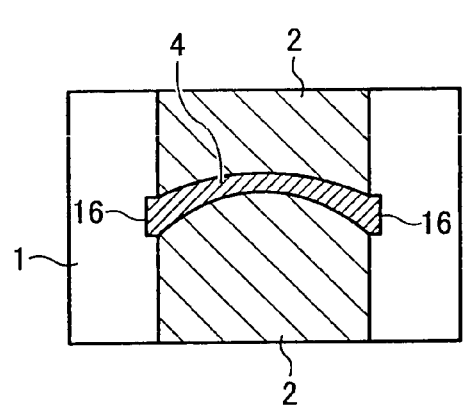
FIGS. 7C and 7D are schematic views of relationships of resin and metal mold, in which a resin is supported by a metal mold.
Figure 7D:
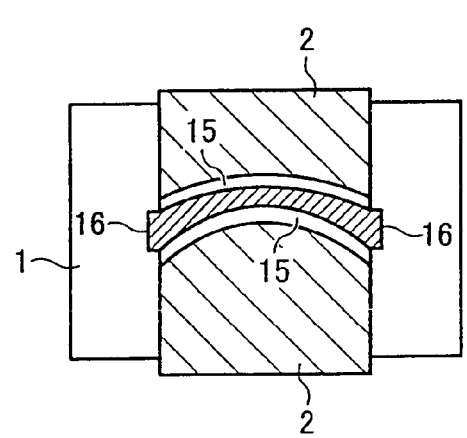

In view of such situation, as shown in FIGS. 7C and 7D, a fixing portion 16 may be provided to the mold unit 1 so that the resin 4 may be maintained or fixed at a given position in the mold unit 1 when an injection molding method is conducted. For example, the resin 4 may be maintained at a given position in the mold unit 1 when separating the transfer face 5 from the resin 4, by which the void 15 may be effectively formed as shown in FIG. 7D.

The fixing portion 16 may be provided to a portion, which may not affect an effective area portion of the mold unit 1, used for forming a molded object (e.g., transfer face). Such portion may be termed as a "non-effective area portion" in the mold unit 1.

In an example embodiment, the movable mold 2 may be moved for a given moving distance having no specific limitation.

However, from a viewpoint of temperature stabilization in the void 15, such moving distance of the movable mold 2 may be preferably set to a smaller value, which can effectively form the void 15.

In an example embodiment, the movable mold 2 may be moved for a first moving distance L1 when forming the void 15, and the movable mold 2 may be moved for a second moving distance L2 when closely re-contacting the resin 4 and the transfer face 5.

Such first moving distances L1 and L2 may have a relationship of "L1<L2" in an example embodiment.

If the first and second moving distances L1 and L2 have a relationship of "L1≧L2," the resin 4 and transfer face 5 may not be re-contacted closely because a surface of the resin 4 may be deformed when the transfer face 5 is separated from the resin 4 during the re-melting process.

If the transfer face 5 and the resin 4 is not effectively re-contacted, a shape or pattern formed on the transfer face 5 may not be transferred to a surface of the resin 4 with high precision.

Accordingly, in an example embodiment, the first and second moving distances L1 and L2 may have a relationship of "L1<L2."

Figure 8A:
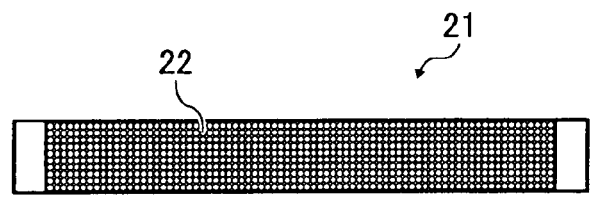
FIGS. 8A and 8B are schematic front and cross-sectional views of another example optical element manufactured by a molding apparatus according to another example embodiment.
Figure 8B:
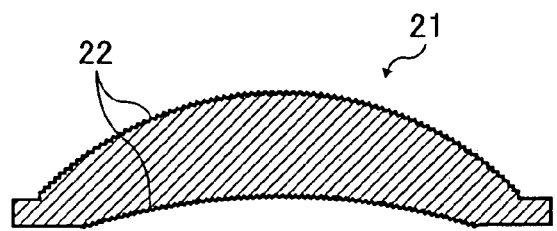

Hereinafter, a molding apparatus 100a for manufacturing an f-theta lens 21 shown in FIGS. 8A and 8B is explained with reference to FIG. 9 as another example embodiment.

The f-theta lens 21 may be used in an optical scanning system of a laser beam printer, for example.

Hereinafter, parts similar to configuration shown in FIGS. 3A to 7D may have a similar or same reference characters or numbers, as required.

FIG. 8A is a schematic front view of the f-theta lens 21, and FIG. 8B is a schematic cross-sectional view of the f-theta lens 21.

The f-theta lens 21 may have a lens face formed with a micro-pattern 22, which may have a given pitch (e.g., 400 nm) and conical shape, for example.

By forming the micro-pattern 22 on the lens face, a surface reflection of the lens face may be reduced without forming a non-reflecting film by a vacuum deposition method.

The f-theta lens 21 may be a rectangular-shaped lens having an uneven thickness shape. For example, the f-theta lens 21 may have a length of 150 mm, a width of 8 mm, a center portion thickness of 20 mm, and an end portion thickness of 5 mm.

The f-theta lens 21 may be made of a resin material such as amorphous polyolefin resin having a softening temperature of 135° C., for example.

Figure 9:
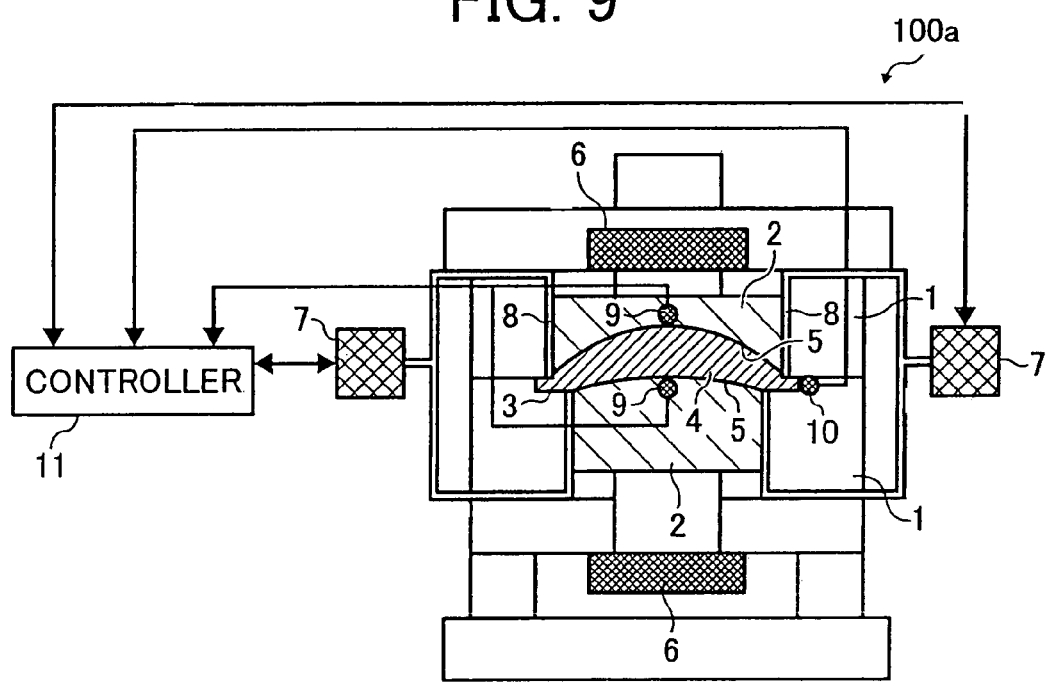
FIG. 9 shows a schematic configuration of a molding apparatus according to another example embodiment.

As shown in FIG. 9, the movable mold 2 may define the cavity 3 having a given volume.

Such movable mold 2 may have the transfer face 5 having a given shape or pattern to be transferred to the resin 4 to be filled in the cavity 3. The transfer face 5 may have a micro-pattern, for example.

The movable mold 2 may be movable in the mold unit 1, and coupled to the mold driving unit 6, which may control the movement of the movable mold 2.

The movable mold 2 has a sliding surface, which may be connected to the compressed gas injector 7 through the communicating hole 8. The compressed gas injector 7 may inject a compressed gas to the cavity 3 through the communicating hole 8.

The mold unit 1 may be maintained at a temperature of 130° C., which may be lower than a softening temperature of amorphous polyolefin resin, by a heater or temperature controller (not shown) or the like.

The amorphous polyolefin resin may be formed into to a molded object by the molding apparatus 100a.

The operation of the molding apparatus 100a shown in FIG. 9 is similar to the operation of the molding apparatus 100 shown in FIG. 3A, and therefore an explanation of the operation of the molding apparatus 100a is omitted.

Hereinafter, an advantage of the molding apparatus 100a shown in FIG. 9 is explained with reference to FIGS. 10A to 10C, which show schematic cross-sectional views of the transfer section of the molding apparatus 100a.

In the molding apparatus 100a, the resin 4 may be quenched and solidified when the resin 4 is injected and fills the cavity 3.

Figure 10A:
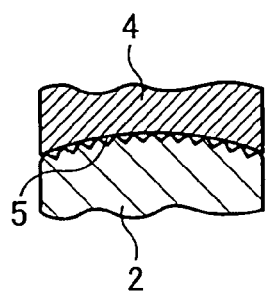
FIGS. 10A to 10C show expanded cross-sectional views of a transfer section in a molding apparatus according to example embodiments.

Accordingly, as shown in FIG. 10A, the resin 4 may not effectively fill a micro-pattern formed on the transfer face 5.

Figure 10B:
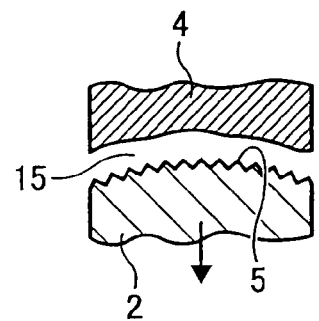

In the molding apparatus 100a, the movable mold 2 may be moved in a given direction so that the transfer face 5 may be separated from the resin 4 to form the void 15 between the transfer face 5 and the resin 4 as shown in FIG. 10B.

With such separation process shown in FIG. 10B, a surface portion of the resin 4 may be re-melted as similar to a configuration shown in FIG. 3B.

When the surface portion of the resin 4 is re-melted, the transfer face 5 having a micro-pattern may be re-contacted closely to the resin 4, such that the micro-pattern formed on the transfer face 5 may be effectively filled by the resin 4.

Figure 10C:
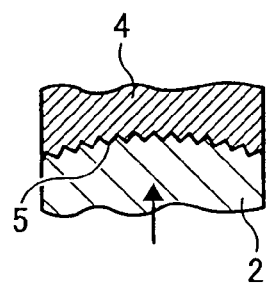

Accordingly, such micro-pattern may be transferred to the surface portion of the resin 4 with high precision as shown in FIG. 10C.

In the example embodiments, the micro-pattern formed on the transfer face 5 may be transferred to the surface portion of the resin 4 with lesser effect of temperature change of the resin 4 compared to a conventional injection molding method.

In general, a conventional injection molding method may be conducted with the steps of: 1) injecting a melted resin into a cavity, having a given volume and shape, through a gate formed in a metal mold; 2) cooling the resin in the metal mold; and 3) removing the cooled resin as molded object.

When injecting the melted resin through the gate, the melted resin may flow into the cavity from one direction.

During such injecting process, the melted resin may be cooled by the metal mold because the metal mold may have a relatively lower temperature. Accordingly, the melted resin may be cooled in the cavity during the injecting process.

Because the cavity has a given volume and a given length in the metal mold, such resin injected into the cavity may have a relatively higher temperature at a gate-near portion of the metal mold and may have a relatively lower temperature at an injecting-end portion of the cavity, wherein the injecting-end portion may be farthest from the gate-near portion. Accordingly, the resin injected in the cavity may inevitably have an uneven temperature distribution.

If a molded object is formed under such temperature condition, the molded object may be produced with a surface shape having lower quality.

On one hand, in the example embodiments, the surface portion of the resin 4 may be in a re-melted condition when the resin 4 is separated from the transfer face 5.

Therefore, even if the resin 4, injected in the cavity 3, may have an uneven temperature distribution in the cavity 3 during a resin injecting process, such uneven temperature distribution may be reduced or suppressed with a re-melting process of the resin 4, such that the resin 4 has a substantially even temperature distribution.

Accordingly, under such temperature control of the resin 4, the transfer face 5 having a micro-pattern may be re-contacted closely to the resin 4, such that the resin 4 may effectively fill such micro-pattern on the transfer face 5.

Therefore, the micro-pattern formed on the transfer face 5 may be transferred to the surface portion of the resin 4 with higher precision as shown in FIG. 10C.

Furthermore, in an injection molding method, a flow direction of resin into a cavity and a pattern-filling direction of resin into a micro-pattern on a transfer face may be different from each other, in general.

For example, the flow direction of resin and the pattern-filling direction of resin may be perpendicular to each other.

Accordingly, the resin may not be effectively filled in a micro-pattern formed on the transfer face by simply injecting the resin in the cavity.

On one hand, in the example embodiments, the surface portion of the resin 4 may be in a re-melted condition when separated from the transfer face 5, and the movable mold 2 may be moved in a given direction so that the transfer face 5 and the resin 4 may be closely re-contacted.

In such re-contacting process, a pattern-filling direction of the resin 4 into the micro-pattern on the transfer face 5 may be substantially aligned with a moving direction of the transfer face 5 (or movable mold 2).

Accordingly, the resin 4 may be easily and effectively filled in a micro-pattern formed on the transfer face 5.

Furthermore, in the example embodiments, the re-melted resin 4 may re-contact closely with the transfer face 5 when the resin 4 still has heat energy, which may be enough for maintaining the resin 4 at a softening temperature or more.

In other words, the resin 4 may not be cooled to a temperature lower than a softening temperature when re-contacting the resin 4 to the transfer face 5.

Accordingly, the resin 4 having a lower viscosity condition may re-contact the transfer face 5, by which a micro-pattern formed on the transfer face 5 may be effectively filled by the resin 4.

Figure 11A:
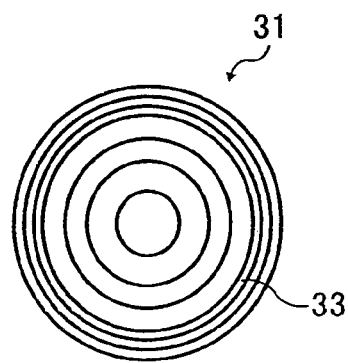
FIGS. 11A and 11B are schematic front and cross-sectional views of another example optical element manufactured by a molding apparatus according to still another example embodiment.
Figure 11B:
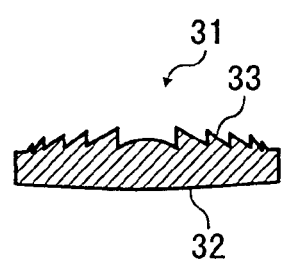

Hereinafter, a molding apparatus 100b for manufacturing a diffraction lens 31 shown in FIGS. 11A and 11B is explained with reference to FIGS. 12A to 12D as another example embodiment. The diffraction lens 31 may be used as an optical pickup unit, for example.

FIG. 11A is a schematic front view of the diffraction lens 31, and FIG. 11B is a schematic cross-sectional view of the diffraction lens 31.

The diffraction lens 31 may have one lens-face having a fine-finished optical plane 32, which may include a convex face, and another lens-face formed with a diffraction pattern 33. The diffraction pattern 33 may have a plurality of orbicular zones, which may be formed with highly fined pitches.

The fine-finished optical plane 32 and diffraction pattern 33 may need to be formed with high precision.

The diffraction lens 31 may be a circle lens having a substantially even thickness. For example, the diffraction lens 31 may have a diameter of 15 mm, and a thickness of about 3 mm.

The diffraction lens 31 may be made of a resin material such as polycarbonate resin having a softening temperature of 145° C., for example.

As shown in FIG. 12A to FIG. 12D, a movable mold 36 and a fixed mold 37 may define the cavity 3 having a given volume.

As shown in FIGS. 12A to 12D, such movable mold 36 may have a transfer face 35 for the diffraction pattern 33, and the fixed mold 37 may have a transfer face 34 for the fine-finished optical plane 32.

Figure 12A:
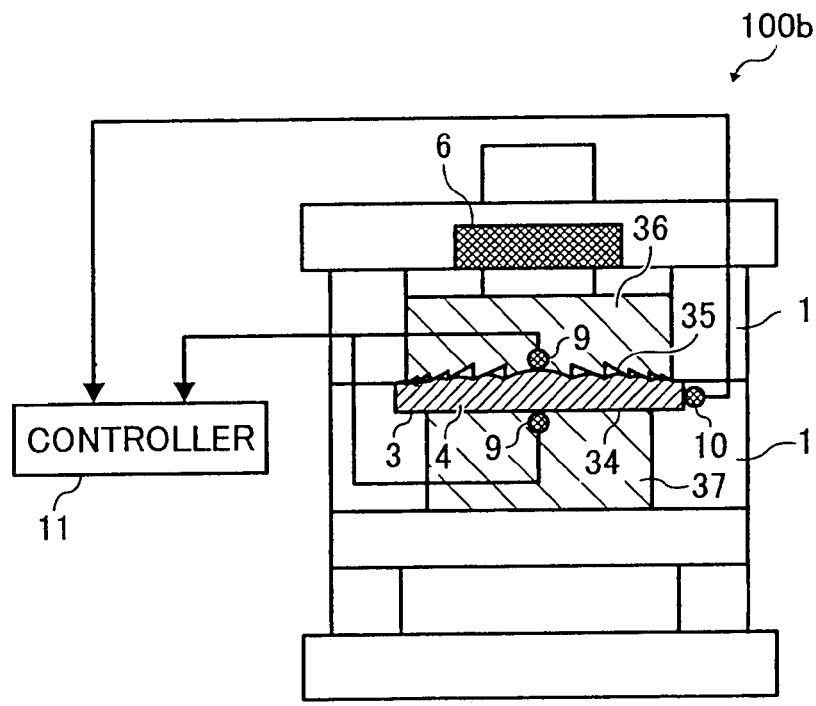
FIGS. 12A to 12D show a schematic configuration of a molding apparatus according to still another example embodiment.

The movable mold 36 having the transfer face 35 for the diffraction pattern 33 may be movable in the mold unit 1, and coupled to the mold driving unit 6, which may control the movement of the movable mold 36, as shown in FIG. 12A.

The fixed mold 37 having the transfer face 34 for fine-finished optical plane 32 may be fixed in the mold unit 1, by which the fixed mold 37 may not move when conducting an injection molding.

The mold unit 1 may be maintained at a temperature of 140° C., which may be lower than a softening temperature of polycarbonate resin, by a heater or temperature controller (not shown) or the like.

The polycarbonate resin may be formed into a molded object by the molding apparatus 100b.

The operation of the molding apparatus 100b shown in FIG. 12A is similar to the operation of the molding apparatus 100 shown in FIG. 3A, and therefore an explanation of the operation of the molding apparatus 100b shown in FIG. 12A is omitted.

At first, the melted resin 4 (e.g., polycarbonate resin) may be injected and filled in the cavity 3 through a gate (not shown) of the molding apparatus 100b. The melted resin 4 may have a given pressure in the cavity 3.

With such pressurized melted resin 4, the transfer face 34 of fixed mold 37 may be transferred to the melted resin 4 as the fine-finished optical plane 32 (see FIG. 11B).

When the melted resin 4 is injected and filled in the cavity 3, the movable mold 36 having the transfer face 35 of the diffraction pattern 33 may be controlled by the mold driving unit 6, coupled to the movable mold 36.

Specifically, the mold driving unit 6 may apply a biasing force or pressure to the movable mold 36 so that the movable mold 36 may not be moved by the pressurized melted resin 4.

For example, the mold driving unit 6 may apply a biasing force or pressure, which may be greater than a maximum resin pressure occurred in the cavity 3.

When the maximum temperature of resin 4 in the cavity 3 becomes greater than a softening temperature of the resin 4 and the resin pressure in the cavity 3 becomes 0.5 MPa or more during a time period when the injected resin 4 is cooled by the mold unit 1, having a relatively lower temperature, the movable mold 36 may be moved in a given direction so that the movable mold 36 may be separated from the resin 4.

Figure 12B:
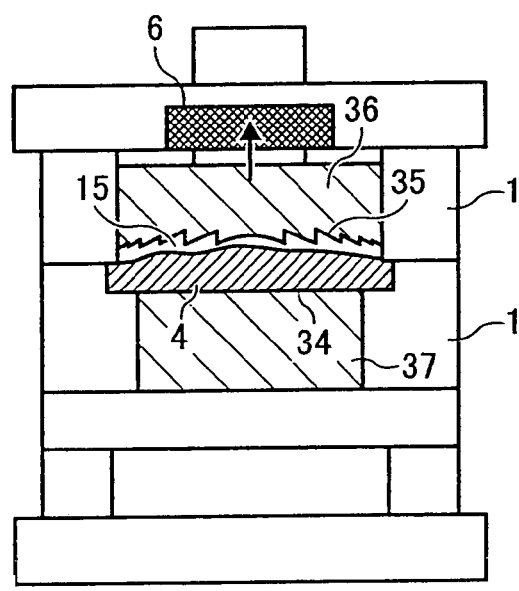

With such separation process, the void 15 may be formed between the transfer face 35 having the diffraction pattern 36 and the resin 4 as shown in FIG. 12B.

After separating the movable mold 36 from the resin 4, the resin 4 may have an internal heat distribution therein, in which a center portion of the resin 4 may have relatively larger heat energy and a surface portion of the resin 4 may have relatively smaller heat energy.

Accordingly, heat energy may be transferred from the center to the surface portion of the resin 4, such that the surface portion of the resin 4 may be heated again and re-melted.

When the temperature sensor 9 detects that a surface portion temperature of the resin 4 becomes greater than a softening temperature of the resin 4, the mold driving unit 6 may move the movable mold 36 in a given direction so that the movable mold 36 may closely re-contact the resin 4, such that the resin 4 and the transfer face 5 closely re-contact each other.

Figure 12C:
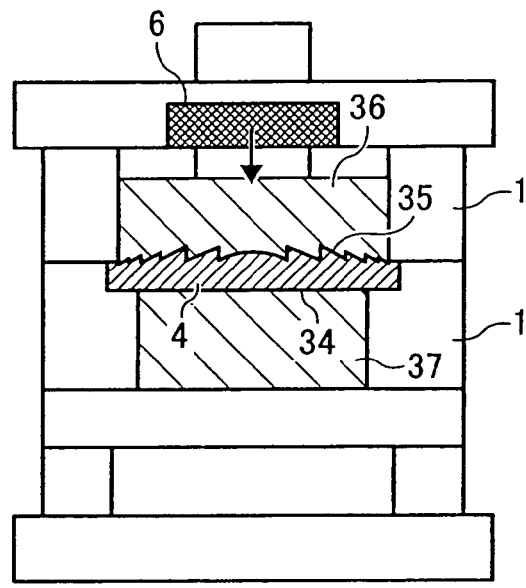

With such re-contacting process, a shape or pattern formed on the transfer face 35 may be transferred on a surface of the resin 4 as diffraction pattern 33 shown in FIG. 12C.

Figure 12D:
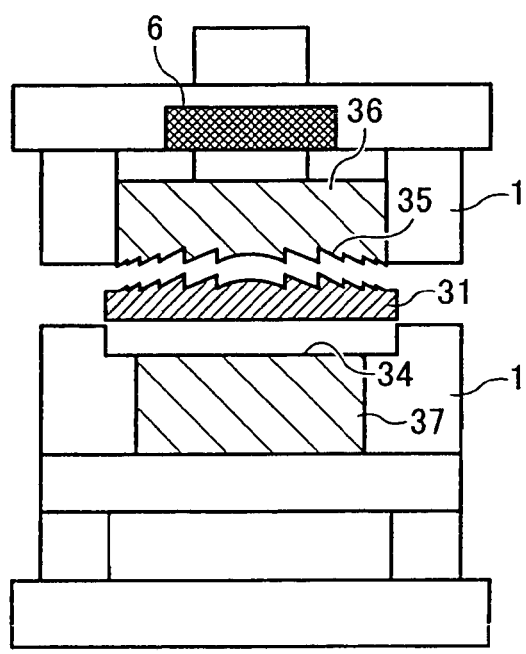

After cooling the resin 4 to a temperature of the mold unit 1, the diffraction lens 31 may be removed from the mold unit 1 as a molded object as shown in FIG. 12D.

In the molding apparatus 100b shown in FIGS. 12A to 12D, the melted resin 4 may be injected and filled in the cavity 3 through a gate (not shown) of the molding apparatus 100b. Such melted resin 4 may have a given pressure in the cavity 3.

With such pressurized melted resin 4, the transfer face 34 of fixed mold 37 may be transferred to the melted resin 4 as fine-finished optical plane 32 (see FIG. 11B).

At this time, the resin 4 may be in quenched condition, and thereby the resin 4 may not be effectively filled in a diffraction pattern 33 formed on the transfer face 35.

The transfer face 35 having the diffraction pattern 33 may be separated from the resin 4 to form the void 15 between the transfer face 35 and the resin 4.

At this condition, the resin 4 has a portion facing the void 15, which may be termed as "free face portion" because such portion may not contact a wall face defining the cavity 3, and hereby such wall face may not restrict such free face portion of the resin 4.

Such free face portion of the resin 4 may have a relatively greater fluidity than other portions of the resin 4. Such fluidity at the free face portion of the resin 4 may reduce an occurrence of unevenly distributed pressure in the resin 4, such that the diffraction lens 31 (as molded object) produced by cooling the resin 4 has a lesser internal strain.

Furthermore, similar to the above-explained molding apparatus 100 shown in FIG. 3A, a surface portion of the resin 4, facing the void 15 may be re-melted by separating the resin 4 from the transfer face 35.

At the time when the surface portion of the resin 4 is re-melted, the transfer face 35 having the diffraction pattern 33 may be re-contacted closely to the surface portion of the resin 4.

With such re-contacting process, the melted resin 4 may fill a diffraction pattern 33 formed on the transfer face 35, and thereby such diffraction pattern 33 may be transferred on the resin 4 effectively.

Similar to example embodiments shown in FIGS. 3A and 9, in the molding apparatus 100b, the mold unit 1 may be maintained at a temperature lower than a softening temperature of the resin 4, by which a molding cycle may be set to a shorter period of time.

Accordingly, the fine-finished optical plane 32 and diffraction pattern 33 may be transferred on the resin 4 with a shorter molding cycle.

Furthermore, in the molding apparatus 100b, the fixed mold 37 may be fixed to a given position, and the movable mold 36 may move with respect to the resin 4 in the cavity 3.

Accordingly, a structure of mold unit 1 may be simplified, such that the manufacturing cost of the mold unit 1 is reduced.

Furthermore, the molding apparatus 100b may have the fixed mold 37 having the transfer face 34, which may not be separated from the resin 4.

If such configuration is employed for the molding apparatus 100b, the movable mold 36 may be preferably separated from the resin 4 at a time when the pressure of the resin 4 in the cavity 3 is at least 0.5 MPa.

If the movable mold 36 is separated from the surface of the resin 4 when the pressure of the resin 4 is too small, a surface of the resin 4, facing the transfer face 34 of the fixed mold 37, may be separated from the transfer face 34 before the void 15 may be formed between the movable mold 36 and the resin 4.

In such a case, a surface sink may occur on the surface of the resin 4 facing the transfer face 34.

In the molding apparatus 100b, the transfer face 34 may be used to form the fine-finished optical plane 32 on the diffraction lens 31, in which the fine-finished optical plane 32 may be transferred on the resin 4 with a resin pressure which may occur during a resin injection process, and thereby a re-melting of surface portion of the resin 4 may not be required at the transfer face 34 side.

In the molding apparatus 100b, a molded object may be produced by separating at least one face (e.g., transfer face 35) from the resin 4 temporarily.

Such separation process may be preferable for producing a molded object having less unevenly distributed pressure or less strain in a resultant molded object.

If only one transfer face may be separated from the resin 4 as shown in FIG. 12B, the void 15 may be formed on one side of the resin 4, which may be termed as one-sided void 15.

In the molding apparatus 100 shown in FIGS. 3A to 3D, a lens having a fine-finished optical plane on both sides of the lens may be manufactured by separating the movable mold 2 from both sides of the resin 4.

However, a lens having a fine-finished optical plane on both sides of the lens may be manufactured by separating only one mold from one side of the resin 4 in the molding apparatus 100 shown in FIGS. 3A to 3D as similar to another example embodiment shown in FIGS. 12A to 12D.

Accordingly, a lens having a fine-finished optical plane on both sides of the lens may be similarly manufactured with higher precision and lower strain in the molding apparatus 100 shown in FIG. 3A.

However, if a molded object has too great of a thickness or too great of an uneven thickness, a one-sided void 15 for the molded object may not be effective to reduce a difference of shrinking rate among portions having an uneven thickness. In such a case, the molded object may not be effectively formed in a higher precision shape.

Accordingly, if a molded object has too great of a thickness or too great of an uneven thickness, it may be preferable to form the void 15 on both sides of the resin 4 as shown in the molding apparatus 100 shown in FIGS. 3A to 3D.

Furthermore, in the molding apparatus 100b shown in FIGS. 12A to 12D, a compressed gas may be injected in the cavity 3 before separating the movable mold 36 from the resin 4 to reduce a contact force between the transfer face 35 of the movable mold 36 and the resin 4.

Furthermore, in the molding apparatus 100b, a temperature in the void 15 may be controlled to a given temperature by injecting a temperature-controlled compressed gas in the void 15, by which an injection molding can be conducted under a more temperature stabilized condition.

In the above-described example embodiments, without heating a mold at a higher temperature, and with a shorter molding cycle, a fine-finished optical plane may be transferred to a surface of the resin with lower strain and higher precision.

Furthermore, in the above-described example embodiments, when re-contacting the transfer face and the resin, a pattern-filling direction of the resin into the micro-pattern on the transfer face may be substantially aligned with a moving direction of the transfer face (or movable mold).

Accordingly, a re-melted resin may be closely contacted to a fine pattern formed on a transfer face effectively.

With such close contact of the resin and the transfer face, the resin may easily and effectively fill the fine pattern formed on the transfer face, and thereby such fine pattern may be transferred to a resin material with higher precision. Such fine pattern may include a fine concave/convex shape such as a diffraction pattern, and a non-reflecting pattern.

Accordingly, a resultant molded object having fine pattern with higher precision thereon may be effectively produced with a shorter molding cycle. Furthermore, such molded object may preferably have a smaller internal strain.

The above-described apparatus and method may be applied to any type of injection molding, which may produce a molded object such as optical element having a higher precision surface, a fine-finished optical plane, and a micro-pattern.

The above-described apparatus and method according to the example embodiments may be applied for manufacturing any type of molded objects in addition to a projection lens, a f-theta lens, and a diffraction lens explained in the above example embodiments.

For example, an optical element having a smaller face, to which a fine pattern is transferred, may be produced with higher precision using the above-described apparatus and method according to the example embodiments. Such optical element having a fine concave/convex shape may include an optical waveguide, an optical disk, and a prism, for example.

Numerous additional modifications and variations are possible in light of the above teachings. It is therefore to be understood that within the scope of the appended claims, the disclosure may be practiced otherwise than as specifically described herein.

This application claims priority to Japanese patent application No. 2006-082392 filed on Mar. 24, 2006 in the Japan Patent Office, the entire content of which is hereby incorporated by reference herein.

What is claimed as new and desired to be protected by Letters Patent of the United States is:

1. A method of molding an object with a mold having at least one transfer face, comprising the steps of:
    filling a melted thermoplastic material into a cavity space, defined by the mold, the melted thermoplastic material having a temperature greater than a softening temperature of the thermoplastic material, the mold having a temperature lower than the softening temperature of the thermoplastic material, the melted thermoplastic material being contacted to the at least one transfer face of the mold and being cooled by contacting the mold;
    detecting a temperature of the thermoplastic material;
    separating the transfer face from a surface portion of the melted thermoplastic material, based on temperature information detected, to form a heat-insulating layer between the melted thermoplastic material and the transfer face;
    re-melting the surface portion of the thermoplastic material with a heat energy retained inside the thermoplastic material having a temperature still greater than the softening temperature of the thermoplastic material under a condition that the melted thermoplastic material is separated from the transfer face of the mold;
    re-contacting the surface portion of the re-melted thermoplastic material closely to the transfer face of the mold based on temperature information detected;
    cooling the melted thermoplastic material to a temperature lower than the softening temperature of the thermoplastic material; and
    removing the cooled thermoplastic material from the mold.

2. The method according to claim 1, wherein the heat-insulating layer includes an air space.

3. The method according to claim 1, wherein the mold includes a movable mold having a transfer face.

4. The method according to claim 3, wherein the mold includes a first movable mold having a first transfer face, and a second movable mold having a second transfer face, and the first and second movable mold move in different directions to form the heat-insulating layer between the first transfer face and the melted thermoplastic material, and the second transfer face and the melted thermoplastic material, respectively.

5. The method according to claim 3, wherein the mold includes a movable mold having a first transfer face and a fixed mold having a second transfer face, and the movable mold moves in a given direction to form the heat-insulating layer between the first transfer face and the melted thermoplastic material.

6. The method according to claim 1, wherein the heat-insulating layer is formed at a timing when an internal temperature of the thermoplastic material is at a softening temperature or more of the thermoplastic material, or at a timing when the surface portion of the thermoplastic material becomes a temperature lower than the softening temperature of the thermoplastic material and the thermoplastic material in the cavity space has an average temperature greater than the softening temperature of the thermoplastic material.

7. The method according to claim 6, wherein the transfer face is re-contacted closely to the melted thermoplastic material when the surface portion of the thermoplastic material is in a re-melted condition having a temperature of the softening temperature of the thermoplastic material or higher after the melted thermoplastic material is separated from the transfer face.

8. The method according to claim 5, wherein the first transfer face of the movable mold is separated from the thermoplastic material to form the heat-insulating layer under a condition that the thermoplastic material has an pressure of 0.5 MPa or more in the cavity space.

9. The method according to claim 1, further comprising a gas injector configured to inject a compressed gas in the mold when forming the heat-insulating layer between the surface portion of the thermoplastic material and the transfer face.

10. The method according to claim 9, wherein the gas injector injects a temperature-controlled compressed gas into the heat-insulating layer after forming the heat-insulating layer.

11. The method according to claim 1, wherein the mold includes a retaining portion configured to hold the melted thermoplastic material at a given position so that the melted thermoplastic material is not moved in the cavity space when the transfer face is separated from the melted thermoplastic material, and the mold provides the retaining portion at a given portion excluding the transfer face.

12. The method according to claim 1, wherein the transfer face is moved with a first moving distance when separating the transfer face from the thermoplastic material when forming the heat-insulating layer between the surface portion of the thermoplastic material and the transfer face, and the transfer face is moved with a second moving distance when re-contacting the transfer face to the thermoplastic material closely, and wherein the first moving distance is set smaller than the second moving distance.

\* \* \* \* \*